(12) United States Patent
Jiang et al.

(10) Patent No.: US 11,238,234 B2
(45) Date of Patent: Feb. 1, 2022

(54) ADJUSTING A VERBOSITY OF A CONVERSATION TURN

(71) Applicant: International Business Machines Corporation, Armonk, NY (US)

(72) Inventors: Shun Jiang, San Jose, CA (US); Robert John Moore, San Jose, CA (US); Margaret Helen Szymanski, Santa Clara, CA (US); Lei Huang, Mountain View, CA (US); Guangjie Ren, Belmont, CA (US); Peifeng Yin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 16/568,067

(22) Filed: Sep. 11, 2019

(65) Prior Publication Data

US 2021/0073337 A1 Mar. 11, 2021

(51) Int. Cl.
*G06F 40/30* (2020.01)
*G06N 20/00* (2019.01)
*G06F 16/332* (2019.01)
*G06N 3/08* (2006.01)

(52) U.S. Cl.
CPC .......... *G06F 40/30* (2020.01); *G06F 16/3329* (2019.01); *G06N 20/00* (2019.01); *G06N 3/084* (2013.01)

(58) Field of Classification Search
None
See application file for complete search history.

(56) References Cited

U.S. PATENT DOCUMENTS

| 8,027,945 | B1 | 9/2011 | Elad et al. |
| 9,558,739 | B2 | 1/2017 | Sims, III et al. |
| 9,858,925 | B2 | 1/2018 | Gruber et al. |
| 10,594,757 | B1 * | 3/2020 | Shevchenko ......... H04L 65/605 |

(Continued)

OTHER PUBLICATIONS

Wikipedia, "Q-Learning," Wikipedia, last edited on Aug. 13, 2019, 7 pages, retrieved from https://en.wikipedia.org/wiki/Q-learning.

(Continued)

*Primary Examiner* — Stella L. Woo
(74) *Attorney, Agent, or Firm* — Zilka-Kotab, P.C.

(57) ABSTRACT

In one general aspect, a computer-implemented method includes identifying current choices with different verbosity levels for a current turn in a conversation; normalizing multi-dimensional verbosity vectors for each of the current choices to obtain a normalized value for each of the current choices; determining a state definition for the current turn in the conversation, utilizing the normalized values for each of the current choices; providing the state definition for the current turn in the conversation and the normalized values for each of the current choices to a trained reinforcement learning module; receiving, from the trained reinforcement learning module, a score associated with each of the current choices for the current turn in the conversation; and selecting one of the current choices to be entered for the current turn in the conversation, based on the score associated with each of the current choices for the current turn in the conversation.

20 Claims, 5 Drawing Sheets

(56) References Cited

U.S. PATENT DOCUMENTS

| | | | | |
|---|---|---|---|---|
| 2011/0173539 A1* | 7/2011 | Rottler | ............... | G06F 3/0482 |
| | | | | 715/727 |
| 2016/0078773 A1 | 3/2016 | Carter et al. | | |
| 2016/0352656 A1 | 12/2016 | Galley et al. | | |
| 2019/0339927 A1* | 11/2019 | Gosu | ............... | H04N 21/42203 |
| 2019/0377796 A1* | 12/2019 | Datla | ............... | G06F 40/289 |
| 2020/0065876 A1* | 2/2020 | MacKenzie | ............... | G06K 9/6276 |
| 2020/0075040 A1* | 3/2020 | Provost | ............... | G06N 3/08 |
| 2020/0125919 A1* | 4/2020 | Liu | ............... | G06F 40/30 |
| 2020/0137002 A1* | 4/2020 | Chavda | ............... | G06F 40/205 |
| 2020/0364301 A1* | 11/2020 | Khosla | ............... | G06N 3/0454 |

OTHER PUBLICATIONS

Sutton, et al., "Reinforcement Learning: An Introduction," The MIT Press, 2014, pp. 1-338.

* cited by examiner

ADJUSTING A VERBOSITY OF A CONVERSATION TURN

BACKGROUND

The present invention relates to textual analysis, and more specifically, this invention relates to optimizing a verbosity of a response to a received question.

Automated question and answer (Q and A) systems are commonly used to perform a variety of customer service actions, from product and service purchases to customer support. It is desirable to have these Q and A systems provide natural, human-sounding responses to questions from users. Appropriate level of verbosity can improve conversation efficiency and reduce the cost of potential repairs caused by confusion. However, current Q and A systems are not able to analyze appropriate level of verbosity of their responses to provide such a natural response, in order to keep verbosity as low as possible while making sure that such response does not confuse the user that receives it, thereby requiring additional follow-up responses to address such confusion.

SUMMARY

A computer-implemented method according to one aspect includes identifying current choices with different verbosity levels for a current turn in a conversation; normalizing multi-dimensional verbosity vectors for each of the current choices to obtain a normalized value for each of the current choices; determining a state definition for the current turn in the conversation, utilizing the normalized values for each of the current choices; providing the state definition for the current turn in the conversation and the normalized values for each of the current choices to a trained reinforcement learning module; receiving, from the trained reinforcement learning module, a score associated with each of the current choices for the current turn in the conversation; and selecting one of the current choices to be entered for the current turn in the conversation, based on the score associated with each of the current choices for the current turn in the conversation.

In another aspect, the state definition is determined by calculating a difference between a normalized verbosity value for a last turn in the conversation and the normalized value for each of the current choices. In yet another aspect, the conversation includes a question and answer (Q and A) conversation.

In this way, a response may be determined to user input in a conversation that minimizes user confusion and maximizes conversation efficiency using appropriate language and phrasing. As such, a repair cost associated with follow-up explanatory responses/turns may be minimized, which may also minimize an amount of data sent between the automated Q and A system and the user.

According to another aspect, a computer program product for adjusting a verbosity of a conversation turn includes a computer readable storage medium having program instructions embodied therewith, where the computer readable storage medium is not a transitory signal per se, and where the program instructions are executable by a processor to cause the processor to perform a method including identifying, by the processor, current choices with different verbosity levels for a current turn in a conversation; normalizing, by the processor, multi-dimensional verbosity vectors for each of the current choices to obtain a normalized value for each of the current choices; determining, by the processor, a state definition for the current turn in the conversation, utilizing the normalized values for each of the current choices; providing, by the processor, the state definition for the current turn in the conversation and the normalized values for each of the current choices to a trained reinforcement learning module; receiving, from the trained reinforcement learning module by the processor, a score associated with each of the current choices for the current turn in the conversation; and selecting, by the processor, one of the current choices to be entered for the current turn in the conversation, based on the score associated with each of the current choices for the current turn in the conversation.

According to another aspect, a system includes a processor; and logic integrated with the processor, executable by the processor, or integrated with and executable by the processor, where the logic is configured to identify current choices with different verbosity levels for a current turn in a conversation; normalize multi-dimensional verbosity vectors for each of the current choices to obtain a normalized value for each of the current choices; determine a state definition for the current turn in the conversation, utilizing the normalized values for each of the current choices; provide the state definition for the current turn in the conversation and the normalized values for each of the current choices to a trained reinforcement learning module; receive, from the trained reinforcement learning module, a score associated with each of the current choices for the current turn in the conversation; and select one of the current choices to be entered for the current turn in the conversation, based on the score associated with each of the current choices for the current turn in the conversation.

In one aspect, for each of the current choices, the score includes a value indicating a suitability of the current choice for use within the current turn in the conversation.

In this way, by minimizing an amount of turns in a conversation, an amount of processing performed by a computing device implementing the automated Q and A system may be reduced, thereby improving a performance of the computing device.

Other aspects and embodiments of the present invention will become apparent from the following detailed description, which, when taken in conjunction with the drawings, illustrate by way of example the principles of the invention.

DETAILED DESCRIPTION

Figure 1:
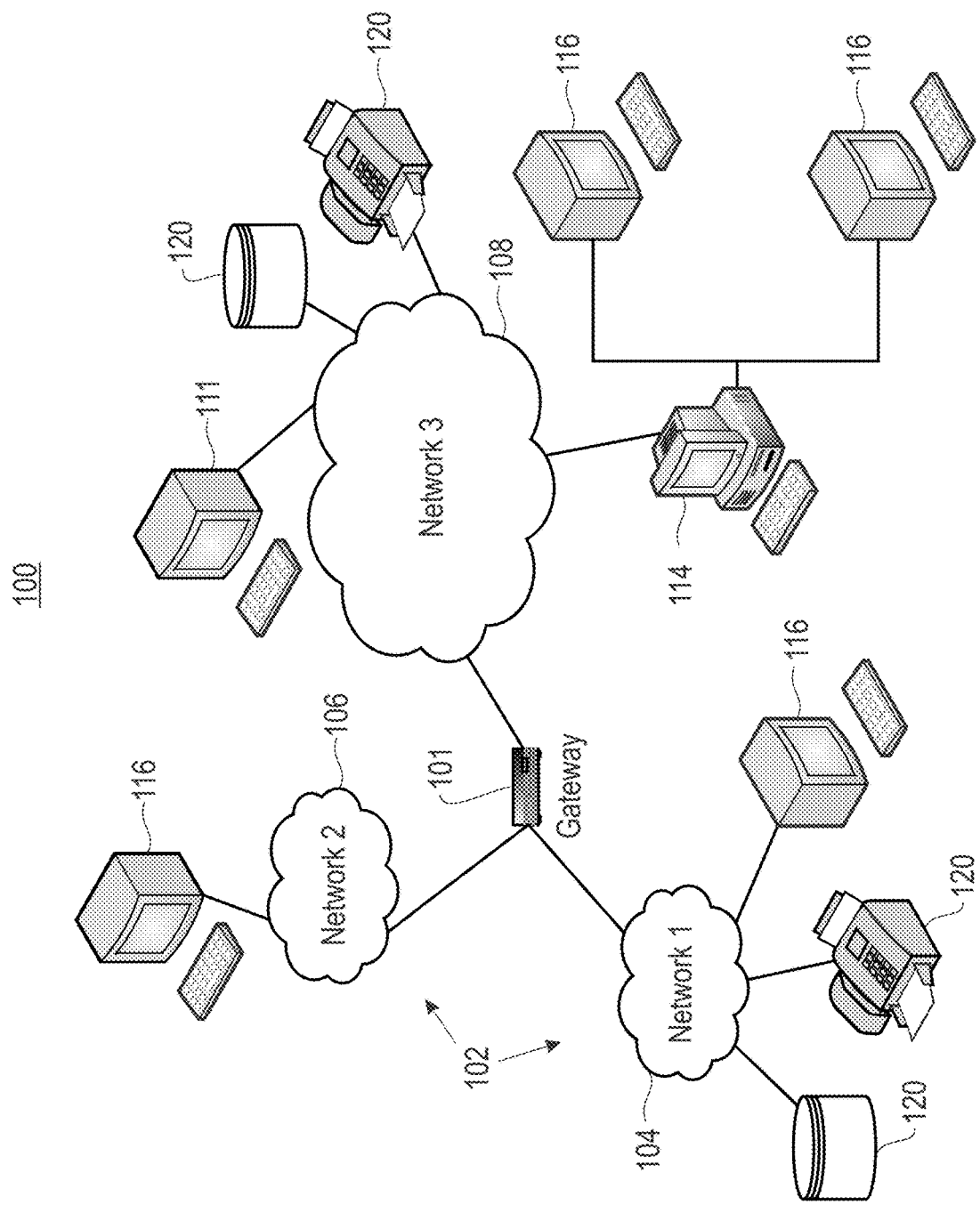
FIG. 1 illustrates a network architecture, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods and computer program products for adjusting a verbosity of a conversation turn.

In one general aspect, a computer-implemented method includes identifying current choices with different verbosity levels for a current turn in a conversation; normalizing multi-dimensional verbosity vectors for each of the current choices to obtain a normalized value for each of the current choices; determining a state definition for the current turn in the conversation, utilizing the normalized values for each of the current choices; providing the state definition for the current turn in the conversation and the normalized values for each of the current choices to a trained reinforcement learning module; receiving, from the trained reinforcement learning module, a score associated with each of the current choices for the current turn in the conversation; and selecting one of the current choices to be entered for the current turn in the conversation, based on the score associated with each of the current choices for the current turn in the conversation.

In another general aspect, a computer program product for adjusting a verbosity of a conversation turn includes a computer readable storage medium having program instructions embodied therewith, where the computer readable storage medium is not a transitory signal per se, and where the program instructions are executable by a processor to cause the processor to perform a method including identifying, by the processor, current choices with different verbosity levels for a current turn in a conversation; normalizing, by the processor, multi-dimensional verbosity vectors for each of the current choices to obtain a normalized value for each of the current choices; determining, by the processor, a state definition for the current turn in the conversation, utilizing the normalized values for each of the current choices; providing, by the processor, the state definition for the current turn in the conversation and the normalized values for each of the current choices to a trained reinforcement learning module; receiving, from the trained reinforcement learning module by the processor, a score associated with each of the current choices for the current turn in the conversation; and selecting, by the processor, one of the current choices to be entered for the current turn in the conversation, based on the score associated with each of the current choices for the current turn in the conversation.

In another general aspect, a system includes a processor; and logic integrated with the processor, executable by the processor, or integrated with and executable by the processor, where the logic is configured to identify current choices with different verbosity levels for a current turn in a conversation; normalize multi-dimensional verbosity vectors for each of the current choices to obtain a normalized value for each of the current choices; determine a state definition for the current turn in the conversation, utilizing the normalized values for each of the current choices; provide the state definition for the current turn in the conversation and the normalized values for each of the current choices to a trained reinforcement learning module; receive, from the trained reinforcement learning module, a score associated with each of the current choices for the current turn in the conversation; and select one of the current choices to be entered for the current turn in the conversation, based on the score associated with each of the current choices for the current turn in the conversation.

FIG. 1 illustrates an architecture 100, in accordance with one aspect. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one aspect.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some aspects.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
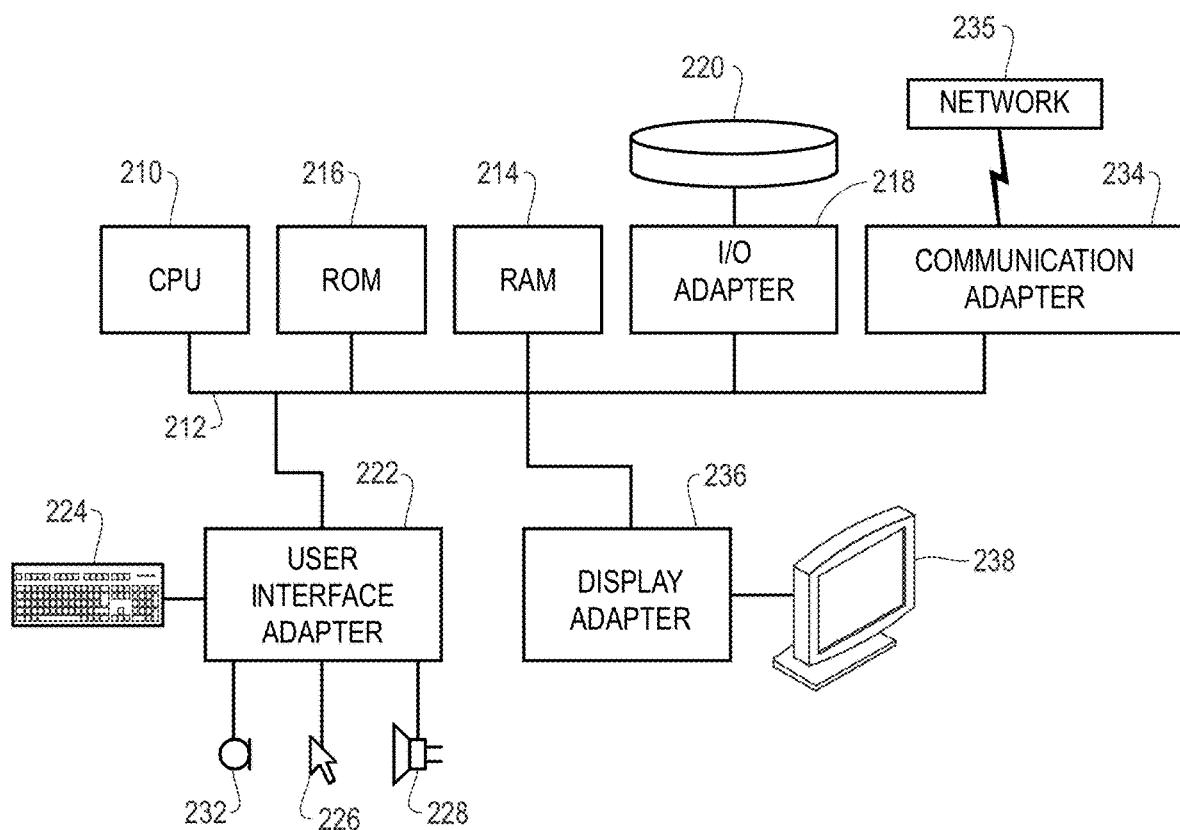
FIG. 2 shows a representative hardware environment that may be associated with the servers and/or clients of FIG. 1, in accordance with one aspect of the present invention.

FIG. 2 shows a representative hardware environment associated with a user device 116 and/or server 114 of FIG. 1, in accordance with one aspect. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred aspect may also be implemented on platforms and operating systems other than those mentioned. A preferred aspect may be written using XML, C, and/or C++ language, or other programming languages, along with an object oriented programming methodology. Object oriented programming (OOP), which has become increasingly used to develop complex applications, may be used.

Figure 3:
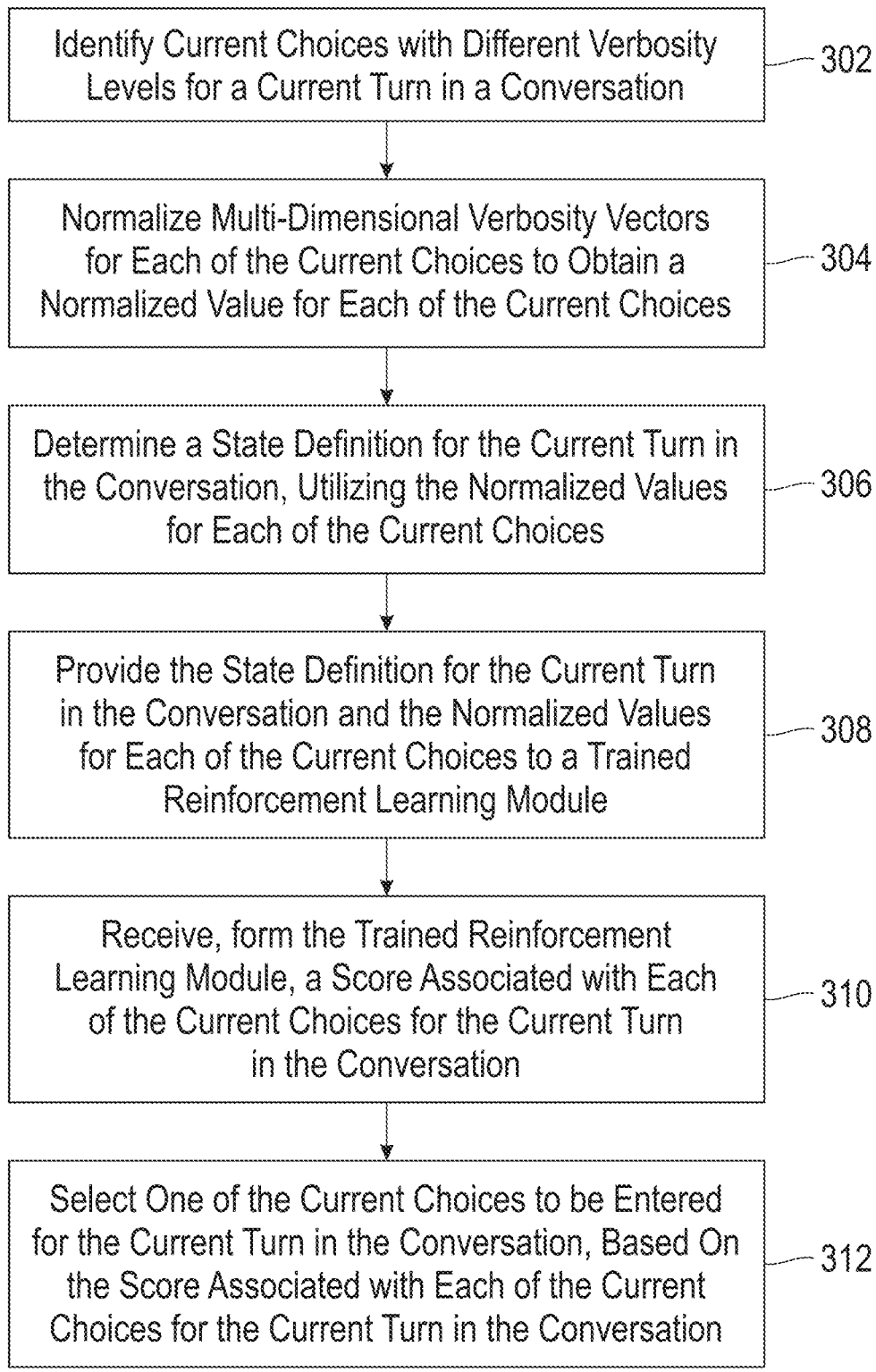
FIG. 3 illustrates a method for adjusting a verbosity of a conversation turn, in accordance with one aspect of the present invention.

Now referring to FIG. 3, a flowchart of a method 300 is shown according to one aspect. The method 300 may be performed in accordance with the present invention in any of the environments depicted in FIGS. 1-2, among others, in various aspects. Of course, greater or fewer operations than those specifically described in FIG. 3 may be included in method 300, as would be understood by one of skill in the art upon reading the present descriptions.

Each of the steps of the method 300 may be performed by any suitable component of the operating environment. For example, in various aspects, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where current choices with different verbosity levels for a current turn in a conversation are identified. In one aspect, the conversation may include a question and answer (Q and A) conversation. For example, the Q and A conversation may occur between an automated Q and A system and a user (e.g., where the user utilizes a client chat bot application, etc.). In another example, textual input may be received from the user during the Q and A conversation.

Additionally, in one example, verbal input may be received from the user during the Q and A conversation, and may be converted into textual input. In another example, the textual input may include one or more questions to be answered by the automated Q and A system.

Further, in one aspect, the conversation may include a verbal conversation. For example, the conversation may include a telephonic conversation between a user and an automated Q and A system. In another aspect, the conversation may include a text-based conversation. For example, the conversation may include a textual chat conversation between a user and an automated Q and A system.

Further still, in one aspect, the conversation may include a plurality of turns. For example, each turn in the conversation may include a statement made from one side of the conversation (e.g., the automated Q and A system or the user). In another example, the user may initiate the conversation during a first turn in the conversation, the automated Q and A system may respond during a second turn in the conversation, and one or more additional turns of the conversation may proceed until the automated Q and A system or the user ends the conversation.

Also, in one aspect, the current turn in the conversation may belong to the automated Q and A system. For example, the user may have submitted verbal or textual input to the automated Q and A system, and may be awaiting a response from the automated Q and A system.

In addition, in one aspect, the current choices for the current turn in the conversation may include proposed responses to the textual or verbal input received from the user in the previous turn in the conversation. In another aspect, the current choices may be automatically generated, based on one or more criteria. For example, the current choices may be automatically generated based on an analysis of the input received in the previous turn, historical responses, etc.

Furthermore, in one aspect, each of the current choices may convey the same one or more predetermined ideas, using different wording and vocabulary. For example, each of the current choices may provide the same answer to a user question using different vocabulary, terminology, level of detail, etc.

Further still, in one aspect, each of the current choices may include a textual word or phrase having wording and vocabulary different from the other current choices. For example, each of the current choices may have a different number of words, different vocabulary use, etc. In another aspect, each of the current choices may have an associated multi-dimensional verbosity vector.

Also, method 300 may proceed with operation 304, where multi-dimensional verbosity vectors for each of the current choices are normalized to obtain a normalized value for each of the current choices. In one aspect, each of the current choices may include a multi-dimensional verbosity vector describing a verbosity of the choice. The verbosity of the choice may include a wordiness of the choice (e.g., an amount of words used to express an idea, etc.). In another aspect, the multi-dimensional verbosity vector for each current choice may include a plurality of values for the current choice.

For example, the multi-dimensional verbosity vector for each current choice may include a value for a number of words used within the current choice. In another example, the multi-dimensional verbosity vector for each current choice may include a value for a type of words used within the current choice (e.g., a number of words used within one or more predetermined domains, etc.). In yet another example, the multi-dimensional verbosity vector for each current choice may include one or more user profile values that affect a comprehension of the user. For instance, the user profile values may include values for a language of the user, a domain skill of the user, etc.

Additionally, in one example, the multi-dimensional verbosity vector for each current choice may include one or more environmental values that affect a comprehension of the user. For instance, the environmental values may include values for a current level of background noise during the conversation, a time and date of the conversation, etc.

Further, in one aspect, normalizing the multi-dimensional verbosity vectors for each of the current choices may include normalizing a word count for each of the current choices. In another aspect, normalizing the multi-dimensional verbosity vectors for each of the current choices may include normalizing one or more domain terminologies for each of the current choices. In yet another aspect, the normalizing may include determining a ranking of the multi-dimensional verbosity vectors for each of the current choices.

For example, the ranking may be based on a comparison of the multi-dimensional verbosity vectors for each of the current choices to historical multi-dimensional verbosity vectors. In another example, each of the multi-dimensional verbosity vectors may be ranked based on their similarity to historical multi-dimensional verbosity vectors. In yet another example, the rank may correlate to the normalized value for the choice. Of course, however, the normalizing may be performed in any manner.

Further still, method 300 may proceed with operation 306, where a state definition for the current turn in the conversation is determined utilizing the normalized values for each of the current choices. In one aspect, the state definition may be determined by summing an absolute distance of each of the verbosity vectors of past turns in the conversation.

For example, each past turn in the conversation may have an associated verbosity vector. In another example, the absolute distances of each of the verbosity vectors may be calculated from the first turn until the current turn in the conversation. In yet another example, these absolute distances may be summed.

Also, in one aspect, the state definition may be determined by calculating a difference between a normalized verbosity value for a last turn in the conversation and each of the normalized values for each of the current choices for the current turn in the conversation.

In addition, method 300 may proceed with operation 308, where the state definition for the current turn in the conversation and the normalized values for each of the current choices are provided to a trained reinforcement learning module. In one aspect, the trained reinforcement learning module may include a model-free reinforcement learning algorithm (e.g., a Q-learning method, etc.).

Furthermore, in one aspect, the trained reinforcement learning module may be trained utilizing historical conversation turns, their associated normalized verbosity values, and outcomes of the historical conversations (e.g., customer satisfaction or disapproval, a completed or incomplete sale, etc.). For example, the historical conversation turns may include turns within textual and/or verbal conversations between the automated Q and A system and one or more users (e.g., the current user and/or one or more additional users different from the current user, etc.) that have occurred at a past time/date and that are different from the current conversation. In another example, the historical conversation turns may be retrieved from one or more saved conversation logs.

Further still, in one aspect, the trained reinforcement learning module may learn a policy, based on the historical conversation turns, their associated normalized verbosity values, and their associated outcome. For example, the associated outcome may include a need for one or more.

Also, in one aspect, choices used for each turn in an historical conversation with an outcome determined to be positive may be weighted higher than choices used for each turn in an historical conversation with an outcome determined to be negative. In another aspect, the trained reinforcement learning module may then apply the policy to the state definition for the current turn in the conversation and the normalized values for each of the current choices in order to determine a score for each of the current choices.

Additionally, method 300 may proceed with operation 310, where a score associated with each of the current choices for the current turn in the conversation is received from the trained reinforcement learning module. In one aspect, for each of the current choices, the score may include a value indicating a suitability of the current choice for use within the current turn in the conversation. In another aspect, a first current choice having a higher score than a second current choice may be determined to be less likely to confuse a user in the conversation, based on historical conversations.

Further, method 300 may proceed with operation 312, where one of the current choices to be entered for the current turn in the conversation is selected based on the score associated with each of the current choices for the current turn in the conversation. In one aspect, a current choice having a highest score may be determined to be the least likely to confuse a user in the conversation, while minimizing a verbosity level, and may be selected to be entered for the current turn in the conversation.

Further still, in one aspect, the selected current choice may be entered by the automated Q and A system for the current turn in the conversation. For example, the selected current choice may be entered as text and returned to the user as part of the conversation. In another example, the selected current choice may be transformed into speech (e.g., using a text-to-speech application) and may be presented verbally to the user (e.g., telephonically, etc.).

In this way, a response may be determined to user input in a conversation that minimizes user confusion and maximizes conversation efficiency using appropriate language and phrasing. As such, a repair cost associated with follow-up explanatory responses/turns may be minimized, which may also minimize an amount of data sent between the automated Q and A system and the user. By minimizing an amount of turns in a conversation, an amount of processing performed by a computing device implementing the automated Q and A system may be reduced, thereby improving a performance of the computing device.

Method for Adaptive Conversational Agent Verbosity Control

Conversational agent systems provide a very efficient human-computer interface. One common goal that these systems attempt to achieve is providing a natural conversation experience. During a conversation, individuals try to use as few words as possible in each turn of the conversation to improve an efficiency of the conversation, as long as the conversation turn does not confuse a recipient of the conversation turn. Professional, subject matter-specific terminologies may be used in order to obtain this simplification. Conversation repairing is necessary when a user who receives a conversation turn is confused as to the content of the turn, and such repairing includes providing additional conversation turns clarifying the earlier turn that caused confusion. Performing conversation repairing by a conversational agent system is resource-intensive, and as a result, it is desirable to avoid confusion associated with conversation turns.

Participants in a conversation attempt to put the right amount of content to each turn to manage the verbosity level in order to achieve an efficient conversation with less conversation repairing. The appropriate verbosity is dynamic on each turn, and is sensitive to a recipient's language and domain skill, a noise of the conversation channel, a cost of conversation confusion, and a reward of final user satisfaction or conversion rate (e.g., a purchase of a good or service, etc.).

A participant in a conversation (e.g., a chatbot) needs to adjust a verbosity based on an estimation of a user profile and environment profile using an observation of past conversation turns. To address this, a chatbot is created that leverages a chat log history and past conversation turns to adjust a verbosity level in order to improve a conversation efficiency while minimizing a conversation repair cost.

There are different factors which may impact a verbosity level that a conversational agent may choose. These factors are categorized into different profiles, as shown below.

User capability profile, e.g. language skill, domain knowledge skill

User meta-capability profile, e.g. learning skill through repairing

Environment profile, e.g. conversation channel noise level

A conversation is a sequence of turns by user and system. For each turn $T_t(t \in [1, n]$, a conversation designer provides different versions of a system response, each having a different verbosity level. The verbosity level is quantified and normalized to a vector $v=[v_a, v_b, \ldots v_x]$ in which:

$v_a \in (0,1)$ is a normalized count of words used in the turn $v_b \in (0,1)$ is a normalized user domain terminology skill $v_x \in (0,1)$ is another metric from a user capability profile and an environment profile which the system wants to consider as a variable to minimize and can be normalized.

Figure 4:
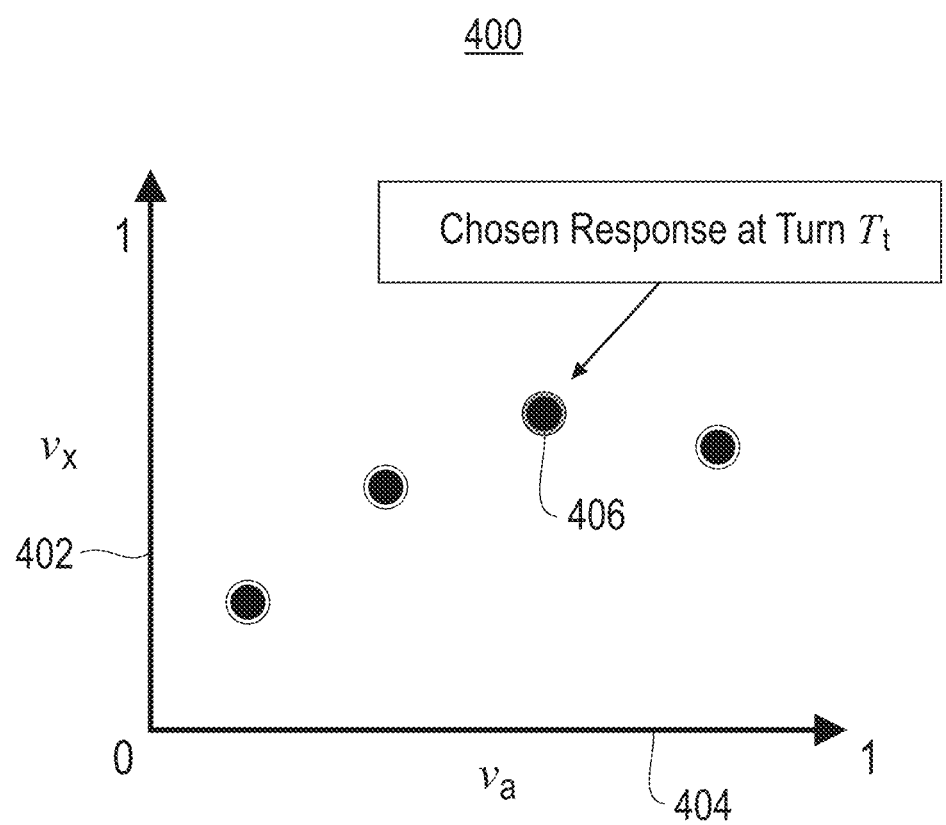
FIG. 4 illustrates a verbosity level vector v of all possible responses at a turn $T_t$, in accordance with one aspect of the present invention.
Figure 5:
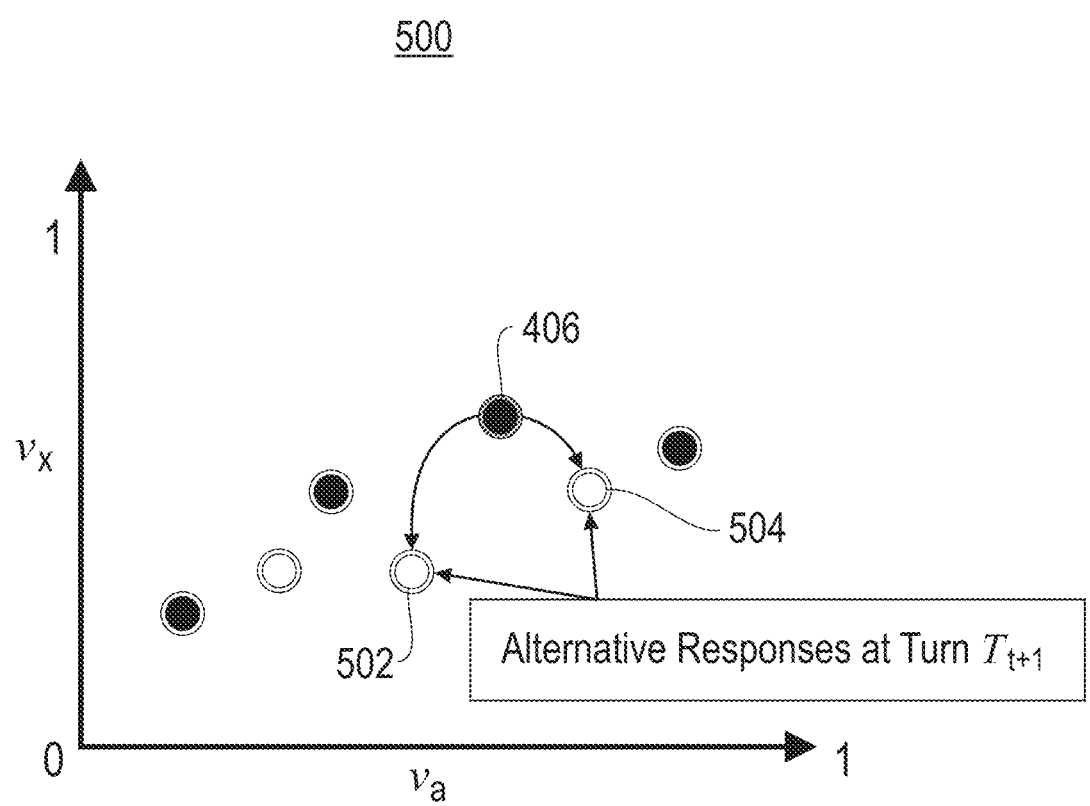
FIG. 5 illustrates a verbosity level vector v having alternative responses that are presented as possible transitions from $T_t$ to $T_{t+1}$, in accordance with one aspect of the present invention.

FIG. 4 illustrates a verbosity level vector v 400 of all possible responses at turn $T_t$, simplified to two dimensions 402 and 404, according to one exemplary aspect. When a response 406 is chosen within the verbosity level vector v 400, FIG. 5 illustrates a verbosity level vector v 500 having alternative responses 502 and 504 that are presented as possible transitions from $T_t$ to $T_{t+1}$, where each of the alternative responses 502 and 504 has its own distinct verbosity level.

The verbosity level of a conversation $V_c$ is defined as $$V_c = \frac{1}{n} * \sum_{t=1}^{n} (\|v_t\| + P * 1_{REPAIRt})$$

which is the target to be minimized by the system as goal. P is a penalty weight for performing conversation repair.

A system is trained to start with an average action at $T_0$ and take an optimal action at $T_{t+1}$ to decide which response should be presented among available responses for $T_{t+1}$ by considering the goal of minimizing $V_c$.

Normalization of Verbosity Vector

Given N conversation history logs $C_i (i \in [1,N])$ as training data:

Let $T_t^i$ denote the $t^{th}$ turn in log $C_i$

Let $W(T_t^i)$ denote the word count of $T_t^i$ w is a list of ordered word count from all turns in logs Additionally, C denotes the current conversation, and $T_t$ is the $t^{th}$ turn of the conversation. A normalized count of words used in the turn $T_t$ may be defined as:

$v_a$=PercentileRank($w, W(T_t)$)

A normalized domain terminology used in the turn $T_t$ may be defined as:

Assuming M terminologies $G_i(i \in [1,M])$ used in a system response, and for each terminology $G_i$ there is a labelled score S by SME and $S(G_i) \in (0,1)$ (a smaller value represents a more advanced domain skill needed to recognize it)

$v_b$=MIN($G_1, G_2, \ldots G_N$)

State Definition of Q-Learning Method

A state S is defined to encode the information of past turns, a reward, and a penalty sequence. It is a vector with the following elements, as shown in Table 1.

TABLE 1

| State S Vector Elements | Description |
| --- | --- |
| $\sum_{i=1}^{t} \|v_{a(i)} - v_{a(i-1)}\|$ | Sum of absolute distance on $v_a$ in past turns |
| $v_{a(t)} - v_{a(0)}$ | Difference from last turn to initial on $v_a$ |
| ... | (repeat on all dimensions from $v_a$ to $v_x$) |
| $v_{a(t)}$ | $v_a$ in last turn |
| ... | ($v_x$ in last turn) |
| $R_t^T$ | Encoded rewards (fixed length vector) in past turns |
| $P_t^T$ | Encoded penalties (fixed length vector) in past turns |

Let $r_t$ denote the sequence of reward in past turns at turn t, which is $r_t=[1-\|v_0\|, 1-\|v_1\|, \ldots 1-\|v_t\|]$. $R_t^T$ is a fixed length vector converted from $r_t$ by function Enc($r_t$). Let $p_t$ denote the sequence of penalty in past turns at turn t, which is $p_t=[1_{REPAIR0}, 1_{REPAIR1}, \ldots 1_{REPAIRt}]$. $P_t^T$ is a fixed length vector converted from $p_t$ by function Enc($p_t$).

$Enc_N(v)$ is a function to compress a vector v of any length $L(L \in [1, \infty))$ into a vector w with fixed length N:

$$\text{Let } v' = \left[\sum_{i=1}^{1} v_i, \sum_{i=1}^{2} v_i, \ldots, \sum_{i=1}^{L} v_i\right]$$

$$w = \left[\text{PERCENTILE}(v', 0), \text{PERCENTILE}\left(v', \frac{1}{N-1}\right), \ldots \text{PERCENTILE}\left(v', \frac{N-1}{N-1}\right)\right]$$

Application of Deep Q-Learning Method

In one aspect, a deep Q-neural network DQN may be built with the following input:

State s at turn t

Verbosity vector v of each action $a \in A(s)$ at turn t, i.e. available responses at turn t The DQN may also have the following output:

Score $x \in [0,1]$ of the action a at state s.

Table 2 illustrates an exemplary implementation of the Q-learning method, according to one exemplary aspect.

TABLE 2

Initialize DQN
Repeat (for each conversation log $C_i$ in training data)
    Initialize S
    Repeat (for each turn in $C_i$):
        Calculate state $s_t$ at turn t
        For each available action $a \in A(s_t)$, calculate score $x \in [0,1]$ using DPN (higher is better)
        Choose action a using $\epsilon$ – greedy policy at turn t, observe $1_{REPAIRt}$
        Use $1 - 1_{REPAIRt}$ as target value and MSE as cost function, update
        DQN with backpropagation algorithm In one aspect, a method may allow a conversational agent to generate responses with optimized verbosity level in order to improve conversation experience by using less redundant language and avoiding repairs. The method may include, for each turn from a user in a conversation, a calculation of a normalized verbosity vector. This normalization may include a normalization of a word count used in the turn, a normalization of one or more domain terminologies used in the turn, a normalization of other variables used to model verbosity, etc.

Additionally, for each response selected in each past turn with assigned vector values, a state of a Q learning method is defined to include a distance of adjacent past turns, a distance from a last turn to an initial turn, a last turn, one or more encoded rewards, and one or more encoded penalties.

Further, the Q-learning method may be applied with the above state definition to train a model, and the trained model may be used to select a response to be presented at each turn in a conversation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various aspects may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method, comprising:
   identifying current choices with different verbosity levels for a current turn in a conversation;
   normalizing multi-dimensional verbosity vectors for each of the current choices to obtain a normalized value for each of the current choices;
   determining a state definition for the current turn in the conversation, utilizing the normalized values for each of the current choices;
   providing the state definition for the current turn in the conversation and the normalized values for each of the current choices to a trained reinforcement learning module;
   receiving, from the trained reinforcement learning module, a score associated with each of the current choices for the current turn in the conversation; and
   selecting one of the current choices to be entered for the current turn in the conversation, based on the score associated with each of the current choices for the current turn in the conversation.

2. The computer-implemented method of claim 1, wherein the conversation includes a question and answer (Q and A) conversation.

3. The computer-implemented method of claim 1, wherein each of the current choices includes a textual word or phrase having wording and vocabulary different from all other current choices.

4. The computer-implemented method of claim 1, wherein each of the current choices includes a multi-dimensional verbosity vector describing a verbosity of the choice.

5. The computer-implemented method of claim 1, wherein the multi-dimensional verbosity vectors for each current choice each include a value for a number of words used within the current choice.

6. The computer-implemented method of claim 1, wherein the multi-dimensional verbosity vectors for each current choice each include a value for a type of words used within the current choice.

7. The computer-implemented method of claim 1, wherein normalizing the multi-dimensional verbosity vectors for each of the current choices includes normalizing a word count for each of the current choices.

8. The computer-implemented method of claim 1, wherein normalizing the multi-dimensional verbosity vectors for each of the current choices includes normalizing one or more domain terminologies for each of the current choices.

9. The computer-implemented method of claim 1, wherein the state definition is determined by summing an absolute distance of each of a plurality of verbosity vectors of past turns in the conversation.

10. The computer-implemented method of claim 1, wherein the state definition is determined by calculating a difference between a normalized verbosity value for a last turn in the conversation and the normalized value for each of the current choices.

11. The computer-implemented method of claim 1, wherein the trained reinforcement learning module includes a Q-learning method.

12. The computer-implemented method of claim 1, wherein for each of the current choices, the score includes a value indicating a suitability of the current choice for use within the current turn in the conversation.

13. The computer-implemented method of claim 1, wherein a current choice having a highest score is determined to be least likely to confuse a user in the conversation, while minimizing a verbosity level, and is selected to be entered for the current turn in the conversation.

14. The computer-implemented method of claim 1, wherein the state definition is determined by summing an absolute distance of each of a plurality of verbosity vectors.

15. A computer program product for adjusting a verbosity of a conversation turn, the computer program product comprising a computer readable storage medium having program instructions embodied therewith, wherein the computer readable storage medium is not a transitory signal per se, the program instructions executable by a processor to cause the processor to perform a method comprising:

identifying, by the processor, current choices with different verbosity levels for a current turn in a conversation;

normalizing, by the processor, multi-dimensional verbosity vectors for each of the current choices to obtain a normalized value for each of the current choices;

determining, by the processor, a state definition for the current turn in the conversation, utilizing the normalized values for each of the current choices;

providing, by the processor, the state definition for the current turn in the conversation and the normalized values for each of the current choices to a trained reinforcement learning module;

receiving, from the trained reinforcement learning module by the processor, a score associated with each of the current choices for the current turn in the conversation; and selecting, by the processor, one of the current choices to be entered for the current turn in the conversation, based on the score associated with each of the current choices for the current turn in the conversation.

16. The computer program product of claim 15, wherein the conversation includes a question and answer (Q and A) conversation.

17. The computer program product of claim 15, wherein each of the current choices includes a textual word or phrase having wording and vocabulary different from the other current choices.

18. The computer program product of claim 15, wherein each of the current choices includes a multi-dimensional verbosity vector describing a verbosity of the choice.

19. The computer program product of claim 15, wherein the multi-dimensional verbosity vectors for each current choice each include a value for a number of words used within the current choice.

20. A system, comprising:

a processor; and logic integrated with the processor, executable by the processor, or integrated with and executable by the processor, the logic being configured to:

identify current choices with different verbosity levels for a current turn in a conversation;

normalize multi-dimensional verbosity vectors for each of the current choices to obtain a normalized value for each of the current choices;

determine a state definition for the current turn in the conversation, utilizing the normalized values for each of the current choices;

provide the state definition for the current turn in the conversation and the normalized values for each of the current choices to a trained reinforcement learning module;

receive, from the trained reinforcement learning module, a score associated with each of the current choices for the current turn in the conversation; and select one of the current choices to be entered for the current turn in the conversation, based on the score associated with each of the current choices for the current turn in the conversation.

\* \* \* \* \*